(12) United States Patent
Penot

(10) Patent No.: US 9,177,183 B2
(45) Date of Patent: Nov. 3, 2015

(54) METHOD FOR READING DATA STORED IN AN ELECTRONIC DEVICE FOR A TYRE

(75) Inventor: Thierry Penot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 159 days.

(21) Appl. No.: 13/988,827

(22) PCT Filed: Nov. 22, 2011

(86) PCT No.: PCT/FR2011/052721
§ 371 (c)(1),
(2), (4) Date: Jun. 11, 2013

(87) PCT Pub. No.: WO2012/069753
PCT Pub. Date: May 31, 2012

(65) Prior Publication Data
US 2013/0248600 A1  Sep. 26, 2013

(30) Foreign Application Priority Data

Nov. 24, 2010 (FR) ...................................... 10 59689

(51) Int. Cl.
*G06K 7/00* (2006.01)
*G06K 7/10* (2006.01)
*G06K 19/077* (2006.01)
*B60C 23/04* (2006.01)

(52) U.S. Cl.
CPC ........ *G06K 7/10297* (2013.01); *B60C 23/0462* (2013.01); *G06K 19/07764* (2013.01); *G06K 19/07786* (2013.01)

(58) Field of Classification Search
CPC ........................... G06K 7/0008; G06K 7/0021
USPC .......................................... 235/439, 384, 385
See application file for complete search history.

(56) References Cited

U.S. PATENT DOCUMENTS 6,087,930 A    7/2000   Kulka et al. .................... 340/447
7,161,476 B2   1/2007   Hardman et al. ............... 340/442

(Continued)

FOREIGN PATENT DOCUMENTS

EP    2 202 099 A1    6/2010
JP    11-514467 A    12/1999

(Continued)

OTHER PUBLICATIONS

B. Green, "EPC SGTIN-96", retrievable at http://www.bisg.org/docs/EPC_SGTIN_96.pdf, pp. 1-3, Jun. 24, 2009.
EPC Tag Data Standard, Version 1.5, published by GS1 EPCglobal, Aug. 18, 2010, www.gs1.org/gsmp/kc/epcglobal/tds/tds_1_5-standard-20100818.pdf, pp. 1-210.
"The Study about Relation of RFID, Bar-code and EPC Code," China Academic Journal Electronic Publishing House (http://www.cnki.net), pp. 69-71 (2008).

*Primary Examiner* — Daniel St Cyr
(74) *Attorney, Agent, or Firm* — Fitzpatrick, Cella, Harper & Scinto

(57) ABSTRACT

An electronic device with data stored therein is integrated into a tire. The data is stored in a memory of the electronic device. The memory includes a data storage zone with a field reserved for a serial number of the tire, which is stored in bit form. When the data stored in the field reserved for the serial number of the tire is read, at least a part of the read data is decoded into at least one letter so as to determine the serial number of the tire.

9 Claims, 1 Drawing Sheet

(56) References Cited

U.S. PATENT DOCUMENTS

| | | |
|---|---|---|
| 7,574,293 B2 * | 8/2009 | Vredevoogd et al. ............ 701/36 |
| 2006/0081697 A1 * | 4/2006 | Brinton et al. ................ 235/377 |
| 2007/0144639 A1 * | 6/2007 | Oh ............................. 152/152.1 |
| 2010/0328059 A1 * | 12/2010 | Kanenari ....................... 340/447 |

FOREIGN PATENT DOCUMENTS

| | | |
|---|---|---|
| JP | 2004-526217 A | 8/2004 |
| JP | 2005-138738 A | 6/2005 |
| WO | WO 97/11443 A1 | 3/1997 |
| WO | WO 02/07993 A2 | 1/2002 |

* cited by examiner

METHOD FOR READING DATA STORED IN AN ELECTRONIC DEVICE FOR A TYRE

FIELD OF THE INVENTION

The present invention relates to the technical field of tyres, and particularly to electronic devices intended to be integrated into a tyre. The invention is applicable to any type of tyre, to private vehicles, and, more particularly, to tyres for industrial vehicles such as vans, heavy vehicles such as light rail vehicles, buses, road transport vehicles such as lorries, tractors and trailers, as well as off-road vehicles such as agricultural or civil engineering vehicles, and many other transport or maintenance vehicles.

BACKGROUND

A tyre is known in the prior art which has data of various kinds inscribed on sidewalls of the tyre, by moulding for example. These data include, notably, an identifier of the tyre manufacturer; geometrical characteristics of the tyre, for example a flange width; a load capacity index; or a speed code. These data also comprise a serial number of the tyre. This serial number comprises a sequence of alphanumeric characters made up of digits and/or numbers and letters.

These inscriptions, notably the serial number, are subject to damage caused by natural phenomena such as sunlight and rain. They are also subject to the normal wear on the tyre, or accelerated wear, caused for example by repeated friction of the sidewall of the tyre against pavements. Finally, these inscriptions may be altered fraudulently by moulding a new layer of rubber over the existing marks.

The disappearance or alteration of inscriptions, notably the serial number, creates a problem in that it prevents the identification of the tyre, for the purpose of routine inspection of the tyre, for example. This problem arises, notably, in circumstances where large numbers of tyres have to be managed, for example in the case of vehicle fleets.

BRIEF DESCRIPTION OF THE INVENTION

The object of the invention is to enable tyres to be reliably identified.

To this end, the invention proposes a data reading method in which the data are stored in an electronic device integrated into a tyre, the device comprising data storage means, the storage means comprising a data storage zone including a field reserved for a serial number of the tyre, stored in bit form, in which method:

the data stored in the field reserved for the tyre serial number are read, and at least a part of the read data is decoded into the form of at least one letter so as to determine the serial number of the tyre.

By storing the data in the electronic device integrated into the tyre, the data are safeguarded from any damage that may be caused by natural phenomena, tyre wear or fraudulent alteration. This is because the device is protected by the rubber of the tyre in which it is generally embedded.

Furthermore, it is no longer necessary to provide a step of moulding data into the tyre sidewalls during the production of the tyre. The tyre production method is therefore simplified.

According to optional characteristics of the method:

The data storage zone comprising the field reserved for a serial number of the tyre is standardized. Preferably, the standardized zone conforms to a special format called SGTIN 96 (standing for Serial Global Trade Item Number, as described in the document "EPC Tag Data Standard version 1.5", published by GS1). Thus the first 8 bits are reserved for a protocol header ("Header"), the next 3 bits are reserved for a filter value ("Filter"), the next 3 bits are reserved for a partition value ("Partition"), the next 20 bits are reserved for an identifier of the tyre manufacturer ("Company Identification"), the next 24 bits are reserved for an item reference ("Item Reference") and the last 38 bits are reserved for a serial number of the tyre ("Serial Number").

At least a part of the read data is decoded into the form of a decimal number, and this decimal number is associated with at least one letter. The number decoded from the bits can be used, with the aid of a matching table for example, to determine which letter corresponds to the part of the read data. Evidently, more complex decoding steps can be used. It should be noted that the term "decimal number" is taken to mean a whole number formed by the juxtaposition of one or more digits, where each digit is a whole number in the range from 0 to 9. Additionally, "associating a decimal number with a letter" is taken to mean that one decimal number corresponds to not more than one letter.

The field reserved for the serial number comprises at least one field of a first type comprising a first number of bits, coding for a first decimal number and at least one field of a second type comprising a second number of bits, coding for a second decimal number. Each bit field is defined by at least one of the following characteristics: a start bit, a number of bits in the field, and an end bit.

The data in each field of the first type are decoded into the form of a first decimal number, and each first decimal number is associated with a letter. Thus a tyre serial number comprising a letter and a number can easily be decoded.

Advantageously, the data read from the field reserved for the serial number are decoded as a function of at least one parameter chosen from among:

the number of fields of the first and second types in the reserved field;

the distribution of the fields of the first and second types in the reserved field;

the first and second number of bits.

Optionally, the standardized storage zone comprises at least one bit field reserved for at least one element chosen from among a protocol header, a filter value, a partition value, an identifier of the tyre manufacturer, and an item reference.

According to a further optional characteristic of the method, the storage means also comprise a non-standardized data storage zone.

The non-standardized zone does not conform to any particular format. It is generally used by motor vehicle manufacturers to store information other than that relating directly to the tyre. It is therefore important for the motor vehicle manufacturer to have access to the whole of this non-standardized zone in order to store the maximum amount of data therein.

The invention further proposes a data writing method in which the data are stored in an electronic device integrated into a tyre, the device comprising data storage means, the storage means comprising a data storage zone including a field reserved for a serial number of the tyre, stored in bit form, the serial number of the tyre comprising at least one letter, and the serial number being encoded in bits; and the encoded serial number being written in the reserved field.

According to optional characteristics of the method:

The data storage zone comprising the field reserved for a serial number of the tyre is standardized. Preferably, the standardized zone conforms to a special format called SGTIN 96 (which stands for Serial Global Trade Item Number, as described in the document "EPC Tag Data Standard version 1.5", published by GS1).

The field reserved for the serial number comprises at least one field of a first type comprising a first number of bits, coding for a first decimal number, and at least one field of a second type comprising a second number of bits, coding for a second decimal number. Each bit field is defined by at least one of the following characteristics: a start bit, a number of bits in the field, and an end bit.

Each letter is associated with a first decimal number, and each first decimal number is encoded in bit form. Thus a tyre serial number comprising a letter and a number can easily be decoded.

The invention also proposes a computer program, characterized in that it comprises instructions in code for causing the steps of a reading or writing method as defined above to be executed when the program is run on a computer.

The invention further proposes a unit for reading data stored in bit form in an electronic device integrated into a tyre for the application of a method as defined above, comprising means for reading data stored in the electronic device and means for decoding the read bits into the form of at least one letter.

BRIEF DESCRIPTION OF THE DRAWINGS

The invention will be more clearly understood from the following description which is provided solely by way of non-limiting example and which refers to the drawings, in which.

DETAILED DESCRIPTION OF THE INVENTION

Figure 1:
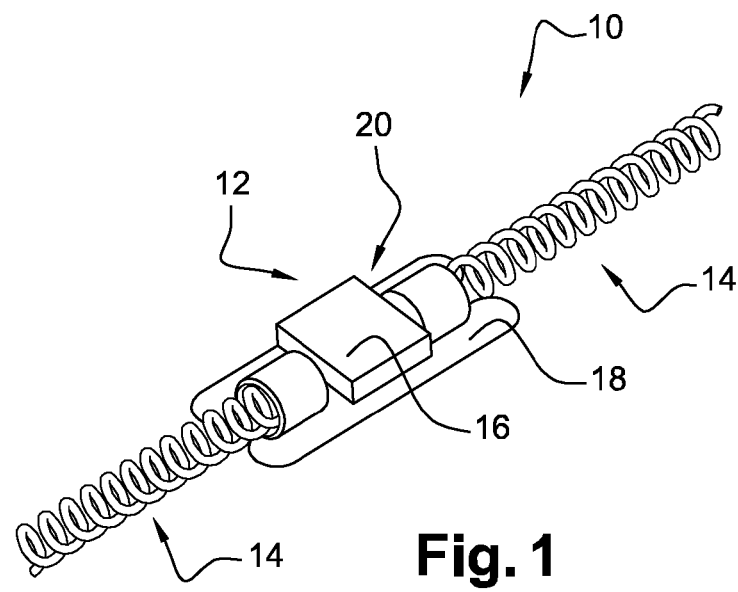
FIG. 1 shows an electronic device of a tyre.

FIG. 1 shows an electronic device according to a first embodiment, indicated by the general reference 10.

The device 10 comprises an electronic member 12 and two antennae 14 forming a dipole. The electronic member 12 comprises an RFID chip 16 fixed to a support 18. Each antenna 14 is helical in shape.

Figure 2:
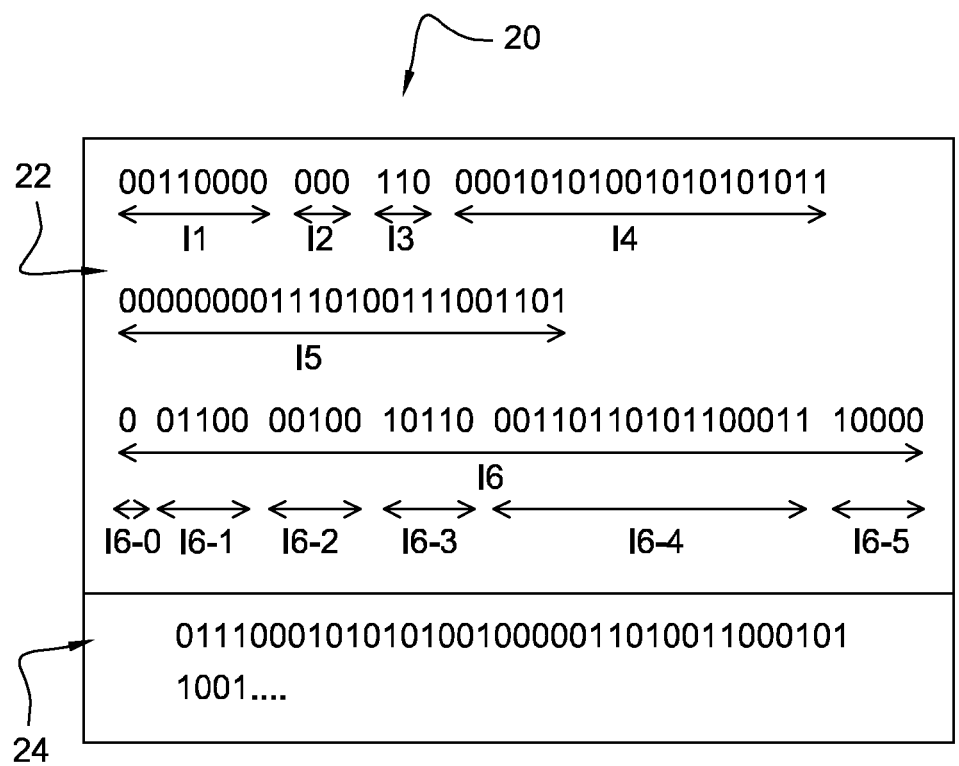
FIG. 2 is a schematic representation of data storage means of the device of FIG. 1.

The electronic member 12 comprises data storage means 20, shown schematically in FIG. 2. The means 20 comprise a standardized data storage zone 22, used here to store a standardized identification number, and a non-standardized data storage zone 24. The data in the standardized zone 22 are stored in 96 bits. The standardized zone 22 is a zone called U2, and the non-standardized zone 24 is a zone called the "user memory".

The standardized zone 22 comprises reserved fields I1-I6 for data stored in bit form. Each field I1-I6 is reserved, respectively, for a protocol header called "Header", a filter value called "Filter", a partition value called "Partition", an identifier of the tyre manufacturer called "Company Identification", an item reference called "Item Reference", and a serial number called "Serial Number". Each field I1-I6 comprises, respectively, 8 bits, 3 bits, 3 bits, 20 bits, 24 bits and 38 bits.

The field I6 reserved for the serial number comprises a field I6-0 formed, by default, by a bit equal to 0. In this example, the field I6 reserved for the serial number comprises S1=4 fields I6-1, I6-2, I6-3, I6-5 of a first type, each comprising a first number N1 of bits, each field I6-1, I6-2, I6-3, I6-5 coding for a number in the range from 0 to 31. Here, N1=5. Therefore the fields I6-1, I6-2, I6-3, I6-5 comprise a total of 20 bits. The field I6 reserved for the serial number also comprises S2=1 field I6-4 of a second type, comprising a second number N2 of bits, the field I6-4 coding for a number in the range from 0 to 131071. Here, N2=17. Therefore the field I6-4 comprises a total of 17 bits.

The non-standardized zone 24 also comprises fields of data stored in bit form.

In this case, the standardized zone 22 comprises the bits 001100000001100001010100101010101100000000011101 001110011010110000100101100011011010110001110000, which code for the data 4806086699059853 LDV28003P, where LDV28003P corresponds to the serial number of the tyre.

The method of reading the data stored in the device 10 will now be described.

The device 10 is embedded in the rubber of a tyre, for example in the body of rubber forming a sidewall of the tyre. A data reading unit is used, comprising means for reading data stored in the electronic device 12. The data reading unit also comprises means for decoding the bits read from the storage means 20 of the device 12. Thus the decoding means comprise a module for decoding bits into decimal format and a module for decoding decimal numbers and/or digits into at least one letter.

The reading unit is used to read the data stored in the standardized zone 22.

The data stored in each reserved field I1-I5 are read. The data read in each field I1, I2, I3, I4 and I5, namely 00110000, 000, 110, 00010101001010101011 and 000000001110100111001101 respectively, are decoded into the form of decimal numbers, namely 48, 0, 6, 086699 and 059853 respectively.

The data stored in the field I6 reserved for the serial number are also read. At least a part of the data read in the field I6 is decoded into the form of at least one letter so as to determine the serial number of the tyre. In this case, the read data are initially decoded into the form of decimal numbers as a function of the following parameters:

the numbers S1, S2 of fields of the first and second types in the reserved field I6;

the distribution of the fields I6-1, I6-2, I6-3, I6-4 and I6-5 of the first and second types in the reserved field I6;

the numbers N1, N2 of bits of the first and second types in the reserved field I6.

In this case, it is known that S1=4 and S2=1. It is also known that the fields are distributed in the following order: I6-1-I6-2-I6-3-I6-4-I6-5, where I6-1, I6-2, I6-3 and I6-5 are fields of the first type and I6-4 is a field of the second type. It is also known that N1=5 and N2=17. Finally, it is known that the first bit of the field I6-0 is, by default, equal to 0.

The data read in each field I6-1, I6-2, I6-3, I6-4 and I6-5, in this case 01100, 00100, 10110, 00110110101100011 and 10000 respectively, are therefore decoded into the form of decimal numbers, in this case 12, 4, 22, 28003 and 16 respectively. Each decimal number read in the fields of the first type is then associated with a letter, using a matching table. In this case, Table 1 below is used.

TABLE 1 matching between numbers and letters in
the field reserved for the serial number.

| Number | Letter |
|--------|--------|
| 1 | A |
| 2 | B |
| 3 | C |
| 4 | D |
| 5 | E |
| 6 | F |
| 7 | G |
| 8 | H |
| 9 | I |
| 10 | J |
| 11 | K |
| 12 | L |
| 13 | M |
| 14 | N |
| 15 | O |
| 16 | P |
| 17 | Q |
| 18 | R |
| 19 | S |
| 20 | T |
| 21 | U |
| 22 | V |
| 23 | W |
| 24 | X |

Thus the data stored in each field I6-1, I6-2, I6-3 and I6-5 code for the letter L, D, V and P respectively. The serial number of the tyre is therefore found to be LDV28003P.

A method for writing the data to the storage means 20 will now be described. The data 48 0 6 086699 059853 LDV28003P are to be written to the standardized zone 22, where the data 48, 0, 6, 086699, 059853 and LDV28003P correspond, respectively, to the protocol header, the filter value, the partition value, the identifier of the tyre manufacturer, the item reference, and the serial number.

Proceeding in the inverse order to that of the reading method described above, the data, in particular the serial number, are encoded in bits. Thus the decimal numbers and letters above are encoded, notably on the basis of Table 1, to provide the following bits: 00110000 000 110 00010101001010101011 0000000011101001110 01101 01100001001011000110110101100011 10000.

All or part of the method according to the invention or any part thereof may be applied by using instructions in code to cause the steps of the method to be executed when it is run on a computer. The instructions may originate from computer programs recorded on a data recording medium such as a hard disk, a flash memory, a CD, or a DVD. It is possible to arrange for a program of this type to be made available for downloading from a telecommunications network, preferably a wireless network such as the Internet or an Intranet. Updates of the program can thus be sent by the network to the computers connected thereto.

The invention is not limited to the embodiments described above.

The electronic member may be either passive, that is to say adapted to communicate data contained in the electronic chip to the reading unit, or active, that is to say adapted to receive data sent by a sensor in order to communicate them to the reading unit. An active member of this type may comprise, notably, a microprocessor and a memory.

Other number and letter matching tables may be used.

The invention claimed is:

1. A method for reading data stored in a memory of an electronic device integrated into a tyre, the memory including a data storage zone with a field reserved for a serial number of the tyre, the serial number being stored in bit form, the method comprising:
   reading out data stored in the data storage zone of the memory, the data being read out from the field reserved for the serial number of the tyre; and
   decoding at least a part of the data read out from the data storage zone of the memory to produce at least one letter used to determine the serial number of the tyre, wherein
   the field reserved for the serial number of the tyre includes at least one sub-field of a first type and at least one sub-field of a second type,
   the at least one sub-field of the first type includes a first number of bits, corresponding to coding for a first decimal number,
   the at least one sub-field of the second type includes a second number of bits, corresponding to coding for a second decimal number,
   data in each sub-field of the first type is decoded to produce a first decimal number, and
   each first decimal number is associated with a letter.

2. The method according to claim 1, wherein the data storage zone with the field reserved for the serial number of the tyre is standardized.

3. The method according to claim 1, wherein the data read out from the field reserved for the serial number of the tyre is decoded as a function of at least one parameter chosen from among:
   a number of the sub-fields of the first and second types in the field reserved for the serial number of the tyre;
   a distribution of the sub-fields of the first and second types in the field reserved for the serial number of the tyre; and
   a number of the first and second numbers of bits.

4. The method according to claim 1, wherein the data storage zone includes at least one bit field reserved for at least one element chosen from among:
   a protocol header;
   a filter value;
   a partition value;
   an identifier of a tyre manufacturer; and
   an item reference.

5. The method according to claim 1, wherein
   the data storage zone of the memory stores standardized data, and
   the memory further includes a non-standardized data storage zone.

6. A method for storing data in a memory of an electronic device integrated into a tyre, the memory including a data storage zone with a field reserved for a serial number of the tyre, the serial number being stored in bit form, the method comprising:
   encoding the serial number of the tyre into bits, the serial number of the tyre including at least one letter; and
   storing the encoded serial number of the tyre in the field reserved for the serial number of the tyre in the data storage zone of the memory, wherein
   the field reserved for the serial number of the tyre includes at least one sub-field of a first type and at least one sub-field of a second type,
   the at least one sub-field of the first type includes a first number of bits, corresponding to coding for a first decimal number, the at least one sub-field of the second type includes a second number of bits, corresponding to coding for a second decimal number, each letter of the serial number of the tyre is associated with a first decimal number, and each first decimal number is encoded in bit form.

7. The method according to claim 6, wherein the data storage zone with the field reserved for the serial number of the tyre is standardized.

8. A non-transitory computer-readable storage medium storing a program that, when executed, causes a computer to perform at least one of:

a decoding method for reading data stored in a memory of an electronic device integrated into a tyre, the memory including a data storage zone with a field reserved for a serial number of the tyre, the serial number being stored in bit form, the decoding method comprising:

reading out data stored in the data storage zone of the memory, the data being read out from the field reserved for the serial number of the tyre, and decoding at least a part of the data read out from the data storage zone of the memory to produce at least one letter used to determine the serial number of the tyre, wherein the field reserved for the serial number of the tyre includes at least one sub-field of a first type and at least one sub-field of a second type, the at least one sub-field of the first type includes a first number of bits, corresponding to coding for a first decimal number, the at least one sub-field of the second type includes a second number of bits, corresponding to coding for a second decimal number, data in each sub-field of the first type is decoded to produce a first decimal number, and each first decimal number is associated with a letter; and an encoding method for storing tyre data in the memory of the electronic device integrated into the tyre, the encoding method comprising:

encoding the serial number of the tyre into bits, the serial number of the tyre including at least one letter, and storing the encoded serial number of the tyre in the field reserved for the serial number of the tyre in the data storage zone of the memory, wherein the field reserved for the serial number of the tyre includes at least one sub-field of the first type and at least one sub-field of the second type, the at least one sub-field of the first type includes the first number of bits, corresponding to coding for a first decimal number, the at least one sub-field of the second type includes the second number of bits, corresponding to coding for a second decimal number, each letter of the serial number of the tyre is associated with a first decimal number, and each first decimal number is encoded in bit form.

9. An electronic apparatus for determining a serial number of a tyre from an electronic device integrated into the tyre, the electronic apparatus comprising:

a sensor equipped to read out data stored in a memory of the electronic device integrated into the tyre, the data being stored in bit form in a data storage zone of the memory, and the data being read out from the data storage zone from a field reserved for the serial number of the tyre; and a processor equipped to decode at least a part of the data read out from the data storage zone of the memory to produce at least one letter used to determine the serial number of the tyre, wherein the field reserved for the serial number of the tyre includes at least one sub-field of a first type and at least one sub-field of a second type, the at least one sub-field of the first type includes a first number of bits, corresponding to coding for a first decimal number, the at least one sub-field of the second type includes a second number of bits, corresponding to coding for a second decimal number, data in each sub-field of the first type is decoded to produce a first decimal number, and each first decimal number is associated with a letter.

* * * * *